United States Patent
Ryoo (10) Patent No.: US 6,570,846 B1
(45) Date of Patent: May 27, 2003

(54) METHOD FOR MONITORING AND CONTROLLING TRAFFIC IN REAL TIME IN AN ATM SWITCHING NODE

(75) Inventor: In-Tae Ryoo, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/318,128

(22) Filed: May 25, 1999

(30) Foreign Application Priority Data

May 25, 1998 (KR) ............................................ 98-18877
Jun. 2, 1998 (KR) ............................................ 98-20447

(51) Int. Cl.[7] .......................... H04L 12/26; H04L 12/56
(52) U.S. Cl. ...................... 370/229; 370/252; 370/395.1
(58) Field of Search ................................ 370/229, 230, 370/231, 232, 233, 234, 235, 252, 463, 395, 412, 415

(56) References Cited

U.S. PATENT DOCUMENTS

| | | | |
|---|---|---|---|
| 5,425,029 A | * 6/1995 | Hluchyj et al. | ............. 370/235 |
| 5,519,689 A | * 5/1996 | Kim | ........................... 370/232 |
| 5,581,545 A | 12/1996 | Moritomo | |
| 5,583,857 A | * 12/1996 | Soumiya et al. | ............. 370/233 |
| 5,594,729 A | * 1/1997 | Kanakia et al. | ............. 370/391 |
| 5,623,492 A | * 4/1997 | Teraslinna | .................. 370/397 |
| 5,640,389 A | 6/1997 | Masaki et al. | |
| 5,721,944 A | * 2/1998 | Gallet et al. | ................. 708/205 |
| 5,737,315 A | 4/1998 | Morimoto | |
| 5,812,526 A | 9/1998 | Chang et al. | |
| 5,812,527 A | * 9/1998 | Kline et al. | .................. 370/232 |
| 5,862,127 A | * 1/1999 | Kwak et al. | ................. 370/233 |
| 5,867,480 A | 2/1999 | Thomas et al. | |
| 6,269,083 B1 | * 7/2001 | Nagata et al. | .............. 370/248 |

FOREIGN PATENT DOCUMENTS

| | | |
|---|---|---|
| JP | 4-340831 | 11/1992 |
| JP | 10-032583 | 2/1998 |
| JP | 10-126414 | 5/1998 |

* cited by examiner

Primary Examiner—Huy D. Vu
Assistant Examiner—Daniel Ryman
(74) Attorney, Agent, or Firm—Robert E. Bushnell, Esq.

(57) ABSTRACT

A method for monitoring and controlling traffic in real time at an asynchronous transfer mode (ATM) switching node, comprising the steps of retrieving the virtual path identifier (VPI)/virtual channel identifier (VCI) field and cell loss priority (CLP) field from the header of a received ATM cell to determine the validity of the cell by checking the effective value of the header for VPI/VCI field, comparing cell monitoring counter value (Cm) with cell control counter value (Cc) to detect violation of traffic parameter when the cell is determined to be valid, determining whether the present user's connection violates the negotiated parameter by means of traffic control data (Active_Idle) and CLP when the cell violates the traffic parameter, holding, tagging and discarding the cell according as the cell violates the negotiated parameter, transferring the result of controlling the valid cell to the physical layer to process the cell, and reporting the cell monitoring counter value to a control panel of upper hierarchy to reset the cell counter control value based on the cell monitoring counter value.

35 Claims, 10 Drawing Sheets

VC A: 51.84 Mb/s(TICAT=3)  VC B: 12.96 Mb/s(TICAT=12)
VC C: 6.48 Mb/s(TICAT=24)  ☐ IDLE CELL

METHOD FOR MONITORING AND CONTROLLING TRAFFIC IN REAL TIME IN AN ATM SWITCHING NODE

This application makes reference to, incorporates the same herein, and claims all benefits accruing under 35 U.S.C §119 from an application entitled Method For Monitoring And Controlling Traffic In Real Time In An ATM Switching Node earlier filed in the Korean Industrial Property Office on 25 May 1998 and Jun. 2, 1998, and there duly assigned Serial Numbers 98-18877 and 98-20447, respectively, by that Office.

BACKGROUND OF THE INVENTION

1. Field of the Invention

The present invention relates to a method of monitoring and controlling traffic in real time in an ATM switching node by controlling the cell transmission rate of various traffic sources having variable bit rates.

2. Description of the Related Art

The ATM (Asynchronous Transfer Mode) network generally requires means for controlling the traffic and bandwidth to effectively transmit information with QOS (Quality Of Service) demanded by the user. The traffic service classes usually provided by the ATM switching system are based on CBR (Constant Bit Rate), RT-VBR (real time-Variable Bit Rate), NRT-VBR (nonreal time-Variable Bit Rate), ABR (Available Bit Rate), UBR (Unspecified Bit Rate), etc. Particularly among these, the VBR service has to be provided in real time as with video signals. Since it needs varieties of bandwidth and shows burst property, the switching node of an ATM network must be provided with means for monitoring and controlling the traffic in order to utilize the network resources over the negotiated traffic parameter. However, if the means for controlling the traffic does not properly work to meet variations of the traffic transmitted over the ATM network, it may cause traffic congestion in the network carrying the VBR traffic.

The GCRA (Generic Cell Rate Algorithm) recommended by the ATM Forum to control the ATM traffic, which is also called 'virtual scheduling algorithm' or 'continuous-state leaky bucket algorithm', is to control the maximum cell transmission rate, cell delay variation, average cell transmission rate and burst allowance. This provides means to control the transmission rate of data cells inputted through the switch by means of limited values of the buffer and increments of the counter determined with traffics. Although GCRA is a simple algorithm with good performance to detect whether the negotiated cell parameter is met, it is not necessary to use this algorithm as UPC (Usage Parameter Control). Instead, any UPC algorithm may be installed provided that QOS may be guaranteed for a call to transmit cells according the negotiated parameter.

Originally, GCRA is proposed as an algorithm to control the cells by detecting violation of the negotiated cell parameter, and gives no rules for the other functions. However, the system designer tends to modify GCRA to monitor the traffic inputted to the switching node in order to measure the rates of using the band by the calls of all the users. In order to control the cell transmission rate, guarantee QOS, and improve the network performance, it is necessary to monitor the traffic transmitted over the network regardless of the ATM service classes. In addition, while it is possible to check the traffic loaded on the network by means of GCRA and the resource management (RM) cell for feedback control, these algorithms are not originally and mainly intended to monitor the traffic, so that the VBR traffic cannot be correctly monitored. Hence, such conventional technologies suffer the following drawbacks when employed to monitor and control the ATM traffic with various characteristics:

1. At least two counters, one for controlling the maximum cell transmission rate and the other for the average cell transmission rate, are required to monitor and control a VBR and VC (Virtual Connection, Virtual Channel, Virtual Circuit).

2. For allotting the network resources to VBR and ABR services are required the buffer size and leaky rate pairs according to the number of the connections. In addition, it is very difficult to uniformly control the network resources for the wideband services with various characteristics.

3. Since the control algorithm for transmitted data cells is executed only at the measurement time interval initially set, it is impossible to measure the real average cell transmission rate. Namely, the accuracy in the cell transmission rate control of GCRA depends on the size of the leaky bucket.

4. While the traffic flowing into the switching node may be controlled by setting the leaky rate, it is impossible to calculate in real time the rate used by all VC's of the resources. In addition, the leaky rate for a certain connection means continuous allotment of a fixed band to the connection, so that it is hardly expected to achieve the optimum efficiency of using the network resources.

5. The size of the buffer in the switch is increased with the burst characteristic of information, thus increasing hardware. In order to serve traffic with large burst characteristic, it is desirable to employ a system like the conventional FRP (Fast Reservation Protocol), which however does not provide the functions of monitoring and reporting the traffic. Besides, since the input data cell is first processed by the buffer, it is unavoidable to delay the process.

6. There is no suitable congestion control mechanism, because of the delay characteristic inherent in the high speed channel, which is necessary to control the congestion of the ATM network. Namely, the conventional congestion control mechanism checks the occupancy rate of the buffer provided in the switch, or measures RTT (Round Trip Time) by sending a special control cell to the network link in order to detect the congestion of the network. However, such detection is not performed in real time, so that it is difficult to cope with the overhead resulting from delay in processing or transmitting cell in each switch.

7. While GCRA may control the traffics flowing into the switching node in the conventional ATM network by setting the leaky rate and buffer size based on the parameter, it is impossible to actively readjust the traffic control data or allotted bandwidth when there flows into the switching node traffics having bit rates varying with time.

These drawbacks may be summarized as follows:

The conventional traffic control algorithm can hardly achieve the optimum effect of multiple statistics that is the best advantage of the ATM network. Moreover, even if there remains available parts in the network resources, QOS is frequently affected with the linked connection. Such problems are caused by the fact that most of the traffic control algorithms are not executed in real time, and the functions in the traffic control are performed independently with one another.

The following U.S. patents are exemplars of traffic controller: U.S. Pat. No. 5,867,480 to Robert E. Thomas et al. entitled Method And Apparatus For Controlling Congestion In A Network Node; U.S. Pat. No. 5,812,526 to Chung-Ju Chang et al. entitled Traffic Control Mechanism In ATM Communications Network; U.S. Pat. No. 5,737,315 to Haruo Moritomo entitled Traffic Control Device In Private ATM Network; U.S. Pat. No. 5,640,389 to Furnitoshi Masaki et al entitled Traffic Shaper and Packet Communication Apparatus; U.S. Pat. No. 5,581,545 to Haruo Moritomo entitled Traffic Control Device in Private ATM Network; and U.S. Pat. No. 5,519,689 to Young-II Kim entitled Traffic Control Apparatus And Method Of User-Network Interface Of Asynchronous Transfer Mode.

SUMMARY OF THE INVENTION

It is an object of the present invention to provide a method for monitoring and controlling traffic in real time in a switching node of an ATM network to guarantee QOS demanded by the user.

It is another object of the present invention to provide a method for controlling the cell transmission rate of VBR traffic flowing into an ATM switching node to optimize the efficiency of using the ATM network resources according to the input state of the traffic.

According to the present invention, a method for monitoring and controlling traffic in real time at an asynchronous transfer mode (ATM) switching node, comprising the steps of retrieving the virtual path identifier (VPI)/virtual channel identifier (VCI) field and cell loss priority (CLP) field from the header of a received ATM cell to determine the validity of the cell by checking the effective value of the header for VPI/VCI field, comparing cell monitoring counter value (Cm) with cell control counter value (Cc) to detect violation of traffic parameter when the cell is determined to be valid, determining whether the present user's connection violates the negotiated parameter by means of traffic control data (Active_Idle) and CLP when the cell violates the traffic parameter, holding, tagging and discarding the cell according as the cell violates the negotiated parameter, transferring the result of controlling the valid cell to the physical layer to process the cell, and reporting the cell monitoring counter value to a control panel of upper hierarchy to reset the cell counter control value based on the cell monitoring counter value.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
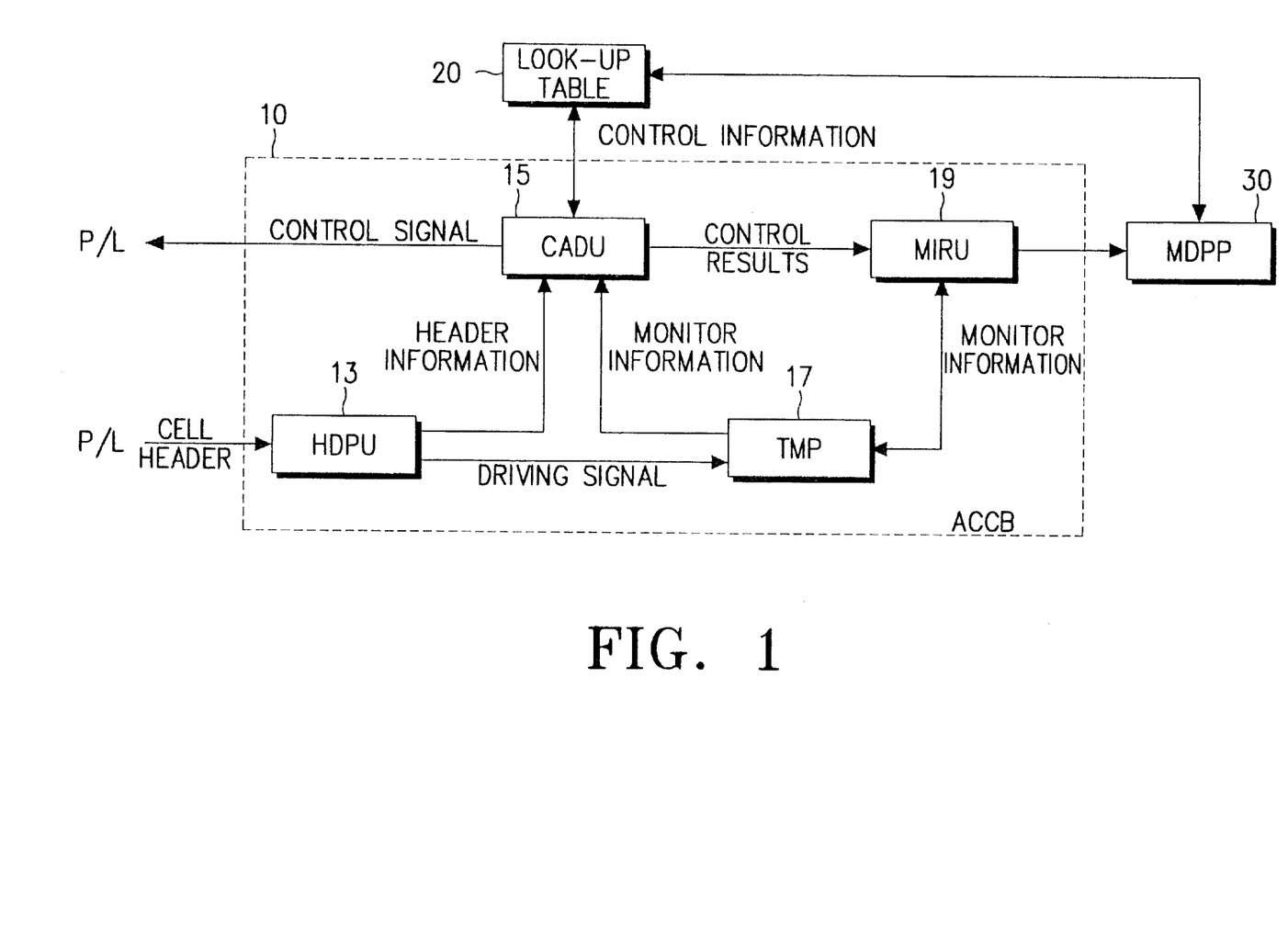
FIG. 1 is a block diagram for illustrating the structure of an ATM cell control block for monitoring and controlling the traffic in real time according to the present invention.

Referring to FIG. 1, an ATM cell control block (ACCB) 10 comprises a header data processing unit (HDPU) 13, control action determination unit (CADU) 15, traffic monitor part (TMP) 17, and monitor information reporting unit (MIRU) 19, connected with a look-up table 20 and monitor data processing part (MDPP) 30.

ATM cell control block 10 measures the time interval between two adjacent cells by a counter in an ATM layer, reporting it to monitor data processing part 30. Header data processing unit 13 receives a 5-byte cell header from a physical layer P/L to apply the header information to control action determination unit 15 and a counter drive signal to traffic monitor part 17 according to a cell clock signal. The header information consists of VPI/VCI and CLP. Control action determination unit 15 transfers VPI/VCI to look-up table 20, and compares the cell monitoring counter value Cm determined by traffic monitor part 17 with the cell control counter value Cc specified in look-up table 20, and applying the result to monitor information reporting unit 19. Additionally, control action determination unit 15 transfers a control signal, such as cell discard signal and a tag signal, resulting from the comparing to the data cell buffer of the physical layer to control the processing of the cell.

Monitor information reporting unit 19 is a logic unit that reports the monitoring counter value Cm (further described with respect to FIG. 8, below) to a control panel by receiving the resultant value of control action determination unit 15, so that monitor data processing part 30 may revise the cell control counter value Cc when the monitoring counter value exceeds a specified control range. The look-up table 20 stores a match flag value to determine validity of a cell according to the VPI/VCI, the cell control counter value Cc and the A_I (Active_Idle) bit to determine violation of the negotiated parameter, and CNS value. Monitor data processing part 30 measures the cell transmission and average cell transmission rate of the presently input data based on the cell monitoring counter value Cm reported by monitor information reporting unit 19, and calculates the information of the rate of using the network resources by all the users' connections to record the traffic control data suitable for the present situation of each user's connection into the look-up table 20 and revise the cell control counter value Cc.

Figure 2:
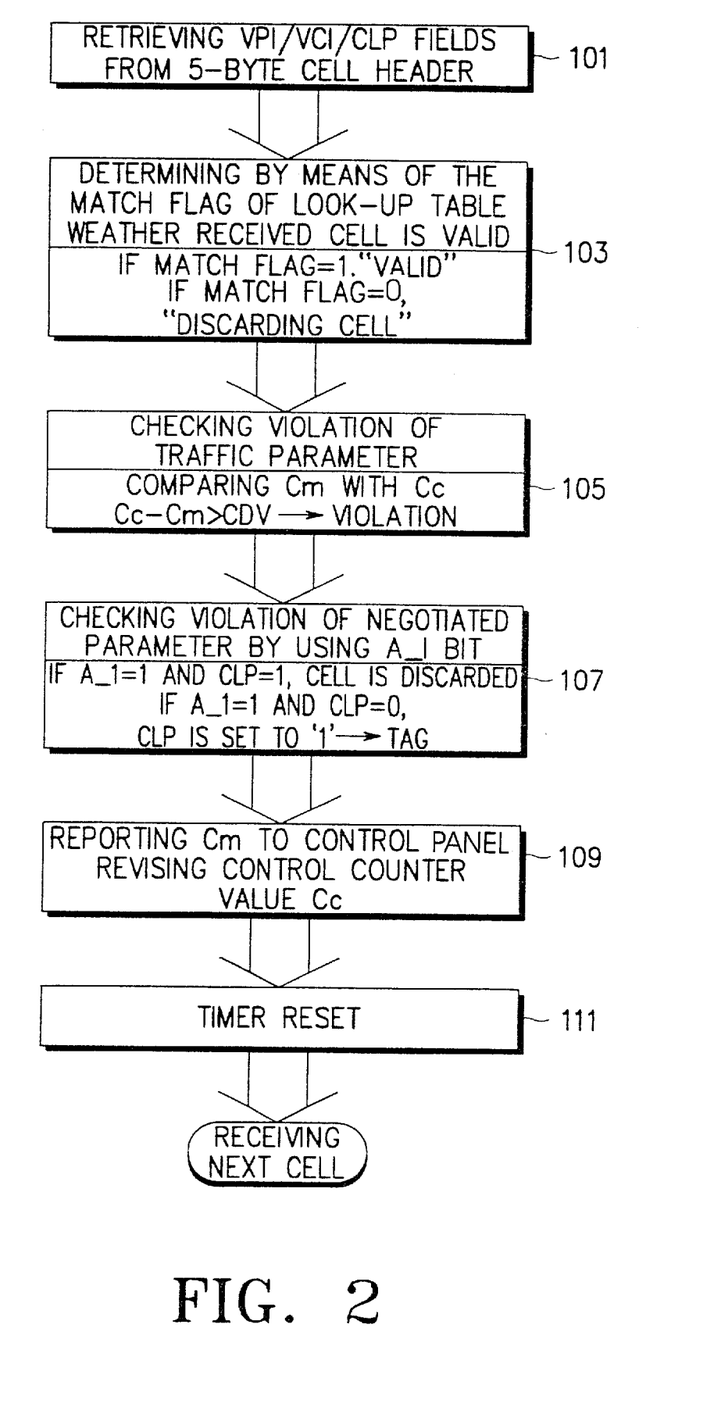
FIG. 2 is a flow chart for illustrating the process of monitoring and controlling the ATM traffic according to the present invention.
Figure 3:
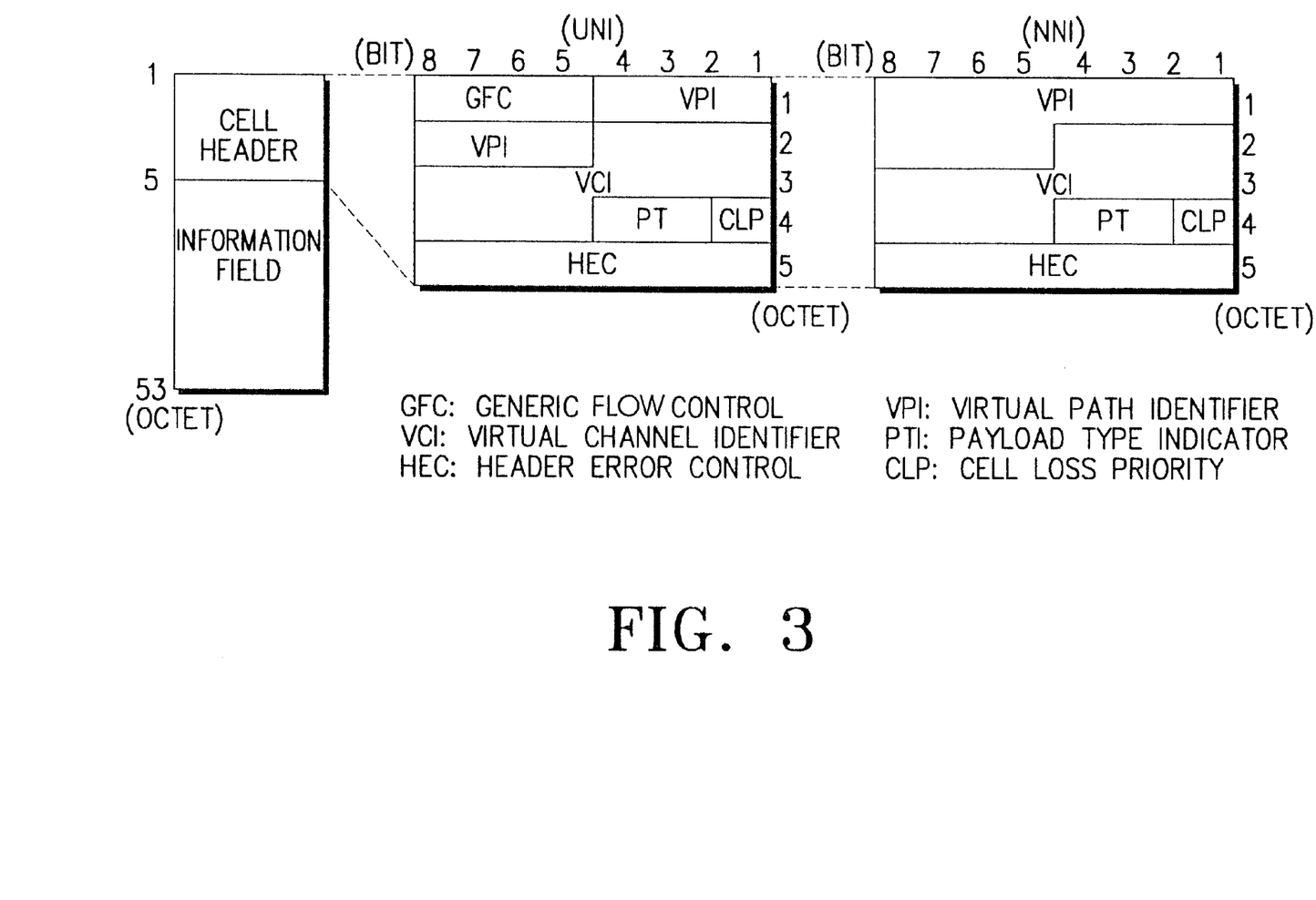
FIG. 3 is a block diagram for illustrating the structure of a typical ATM cell header.

Referring to FIG. 2, in step 101, ATM cell control block 10 retrieves the VPI/VCI and CLP fields from the 5-byte header of a received 53-byte ATM cell. The general structure of the 5-byte ATM cell header is shown in FIG. 3. In step 103, it is determined, by utilizing the match flag value of the look-up table, whether the received cell is validly generated by a rightly set connection. For example, if the match flag of the VPI/VCI field equals '1', the cell is determined as valid. Or otherwise, if the match flag does not equal '1', the cell is determined as invalid, and discarded. If the cell is valid, the cell monitoring counter value Cm is compared with the cell control counter value Cc in step 105 to check violation of the traffic parameter. In this step the predetermined cell delay variation CDV is used during setting the connection to cope with cell concentration. Described more specifically with reference to FIG. 7, if the cell monitoring counter value Cm comes within the cell delay variation CDV specified around the cell control counter value Cc as indicated by Cm2 or Cm3, the cell is allowed. If it is Cm1, the cell is determined as violating the traffic parameter. However, if it is Cm4, the cell is allowed with resetting the next control counter value Cc as Cm4.

In step 107, the traffic control data A_I bit is used to determine whether the present user's connection violates the negotiated parameter, and to control access to the unused bandwidth. For example, if A_I=1 when the CLP field=1, the cell is determined as violating the negotiated traffic parameter, and if A_I=1 when the CLP field=0, it is held. When the cell violates the negotiated parameter, a discard signal is sent to the physical layer and the cell is discarded. When the cell is held, CLP is set to 1 and a control signal 'TAG' is sent to the physical layer to tag the cell. The forgoing steps will be further described with respect to FIG. 6, steps 213 to 223, below.

In step 109, the result of controlling the cell is transferred to the physical layer to process the cell while the cell monitor counter value Cm is reported to the control panel of upper hierarchy, and the cell control counter value Cc is revised in the look-up table on the basis of the above cell monitor counter value. The reason why the cell control counter value Cc is revised is to control the traffic of the next cell by considering the difference between the cell control counter value Cc and the cell monitor counter value Cm even if the presently received cell is valid. The reporting of the cell monitoring counter value Cm is performed in several ways. Although it is most exact to report it every time that it does not agree with Cc, this causes the system to suffer a considerable load. Hence, it is preferable to report it only when the difference between Cm and Cc exceeds cell delay variation CDV. Otherwise, the report may be periodically made at a given time interval, whose optimum value may be determined based on the traffic characteristic and the capacity of calculating the traffic. Additionally, the cell control counter value Cc is reset. After the received cell is monitored and controlled in the above step 109, the cell monitor timer (a binary counter)driven from the P/L during the cell reception is finally reset in step 111, to thereby repeat the previous steps to process the next cell. The above timer is used for comparing the cell monitor counter value Cm with the cell control counter value Cc. The inventive method requires the following functions:

1. Receiving ATM Cell Header

Receiving the cell clock signal representing the system synchronizing signal as well as the 5-byte cell header synchronized to the byte clock signal immediately after the cell clock signal. The cell clock signal is used to drive a binary counter to monitor cells. The cell header received is separated or recombined to be used for monitoring and controlling cells.

2. Checking Validity of ATM Cell Header

The cell header is checked to determine whether the present cell is generated by a user's connection rightly set. This is achieved by sending a VPI of 8 bits (12 bits for NNI (Network to Network Interface)) and a VCI of 16 bits retrieved from the cell header to the look-up table and receiving the corresponding match flag from it.

3. Monitoring Input Cell

All the data cells generated by the VBR traffic source are monitored by a binary counter of specific bits. The capacity of the binary counter is variably adjusted according to the characteristics of the traffic served by the system. For example, a binary counter of 14 bits is to monitor data cells with a low speed up to 16 kbps. Namely, in the case of 16 kbps traffic, assuming that the line speed, representing link speed, is 155.52 Mbps, and the cell transmission rate of the traffic source is Rc, the time interval $T_{icat}$ between two adjacent cells is obtained by the following Equation 1:

$$T_{icat} = \text{line speed} \div Rc \qquad \text{Equation 1}$$

Figure 4:
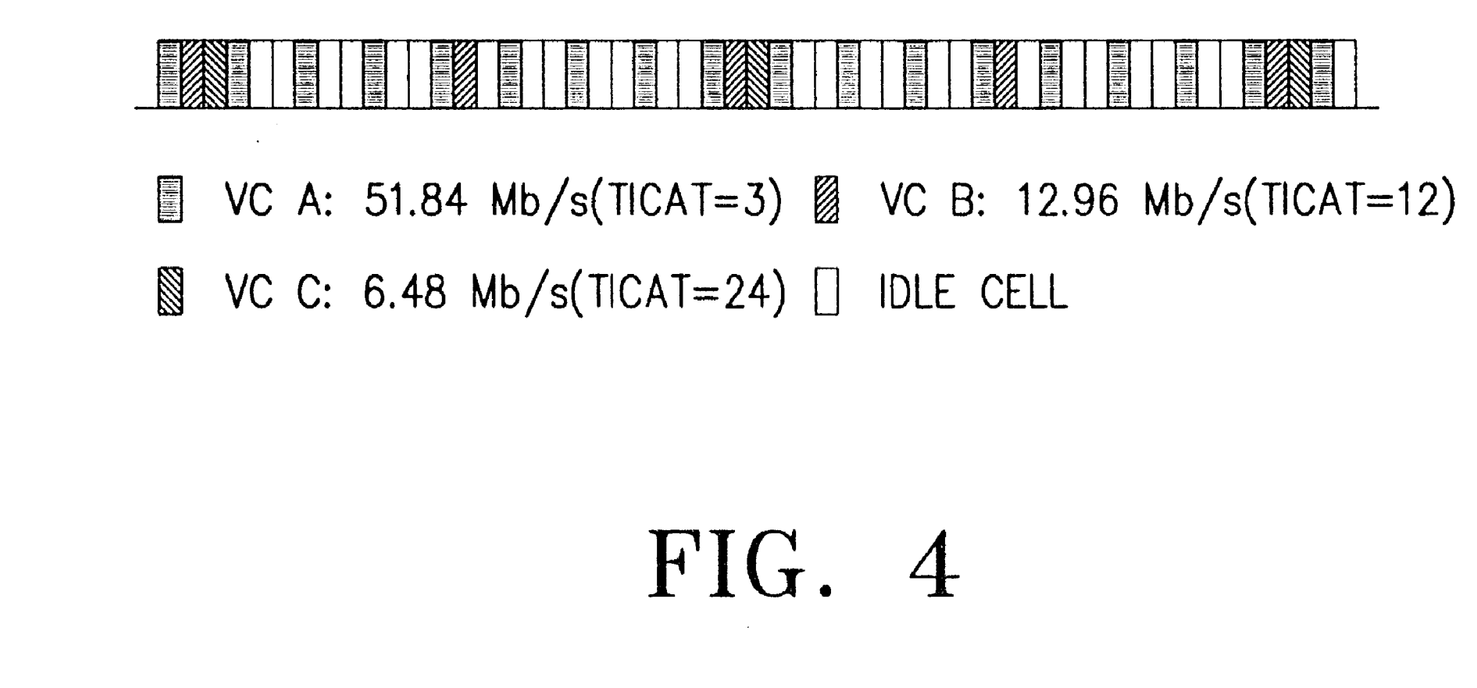
FIG. 4 is a cell diagram for illustrating determination of the capacity of a cell monitoring counter according to the present invention.

Calculating, with 16 kbps traffic by using Eq. 1, the time interval $T_{icat}=(155.52\times10^6)\div(16\times10^3)=9720$(cell time). Hence, the binary counter must have a capacity of 14 bits to monitor the traffic because $2^{13}<9720<2^{14}$. In this example, although the capacity is based on the minimum cell transmission rate, it may be reduced more in the actual situation according to the kind of the traffic to monitor and the negotiated data transmission rate. For example, as shown in FIG. 4, the cell transmission rate of 6.48 Mbps results in the time interval $T_{icat}$ between the adjacent cells being 24, so that a counter of 5-bit capacity is sufficient to monitor the traffic. Likewise, the cell transmission rate of 12.96 Mbps results in a $T_{icat}$ of 12 requiring a counter of 4 bits, and 51.84 Mbps results in a $T_{icat}$ of 3 requiring a counter of 2 bits. Namely, the capacity of the counter is decreased with the increase of traffic speed, so that the size of the hardware installed for policing in the ATM switch may be reduced in an environment such as wide band network or multimedia network.

In addition, the inventive cell monitoring mechanism is designed to monitor the transmission rate of data cells, and therefore, may be applied to control the rate-based ABR traffic. Further, the cell monitoring counter may be modified to count the number of data cells flowing into the switch node in order to be applied to control the credit-based ABR traffic with good cell loss characteristic.

4. Receiving Cell Counter Control Value

When a user's data cell comes in, the look-up table 20 is read to retrieve the cell counter control value Cc corresponding to VPI/VCI retrieved from the 5-byte cell header. The initial cell counter control value Cc, immediately after setting the link connection, is determined by the following Equation 2:

$$Cc = \text{cell size} \div (Rp \times \text{one\_cell\_time}) \qquad \text{Equation 2}$$

Wherein Rp represents the maximum cell transmission rate negotiated during setting the link connection, and one_cell_time is 2.726 μsec from the ATM UNI (User-Network Interface) speed. The cell counter control value Cc may be applied to control the cell transmission rate of the rate-based ABR traffic without modification, and as control data to control the occupancy of the buffer according to the buffer control rule in the credit-based ABR traffic.

5. Controlling Cells

Figure 5:
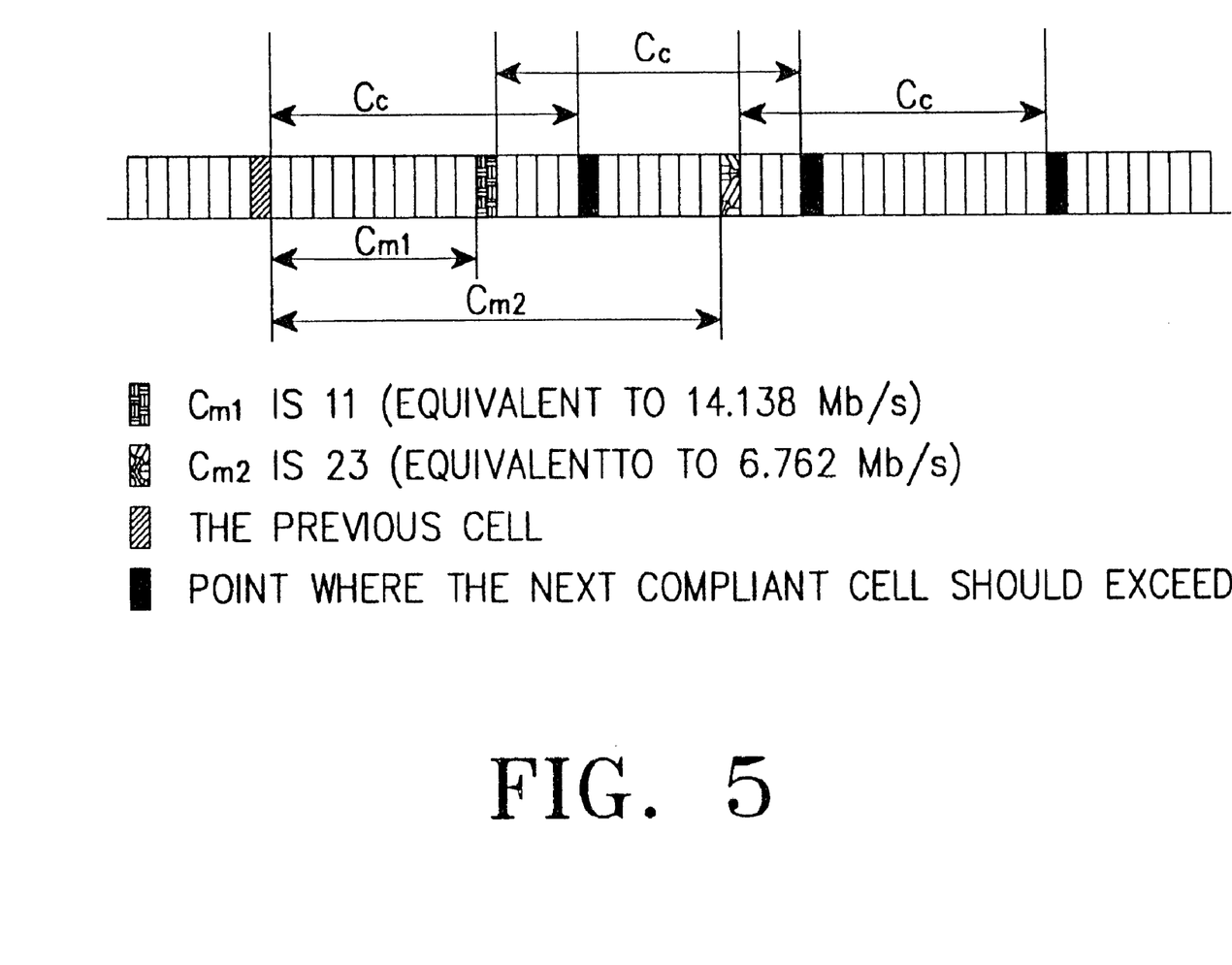
FIG. 5 is a view similar to FIG. 4 but illustrating the use of the cell monitoring counter value and cell control counter value according to the present invention.

The precise controlling of cells is achieved by comparing the cell monitor counter value Cm with the cell control counter value Cc. If Cm is greater than Cc, the cell does not violate the control parameter. Or otherwise, if Cm is smaller than Cc, the cell violates the control parameter. As shown in FIG. 5, if the control value of the present cell transmission rate is 10 Mbps (identical to the counter control value of 16), Cm1 violates the traffic parameter, and Cm2 does not. When finally determining violation of the parameter, the cell control counter value is used with cell delay variation CDV allowing cell delay from the traffic source to the monitoring part, which is to cope with the cell concentration due to statistical multiplicity. Meanwhile, the unique traffic control data A_I bit is used to determine whether the corresponding connection violates the negotiated parameter and to control access to the used bandwidth.

6. Reporting Cell Monitoring Counter Value

The information resulting from monitoring and controlling cells is reported to the control panel to obtain the statistical data for the data cell, and to modify the control information of the connection as desired. Since the cell monitoring counter value Cm is greater than the cell control counter value Cc for most cases in VBR or burst traffic, the cell control counter value Cc is reset based on the cell monitoring counter value Cm. On the contrary, if Cm is smaller than Cc, the cell control counter value Cc is immediately changed by reporting the cell monitoring counter value Cm, which is registered in the look-up table as the cell counter control value with setting of A_I bit.

Figure 6:
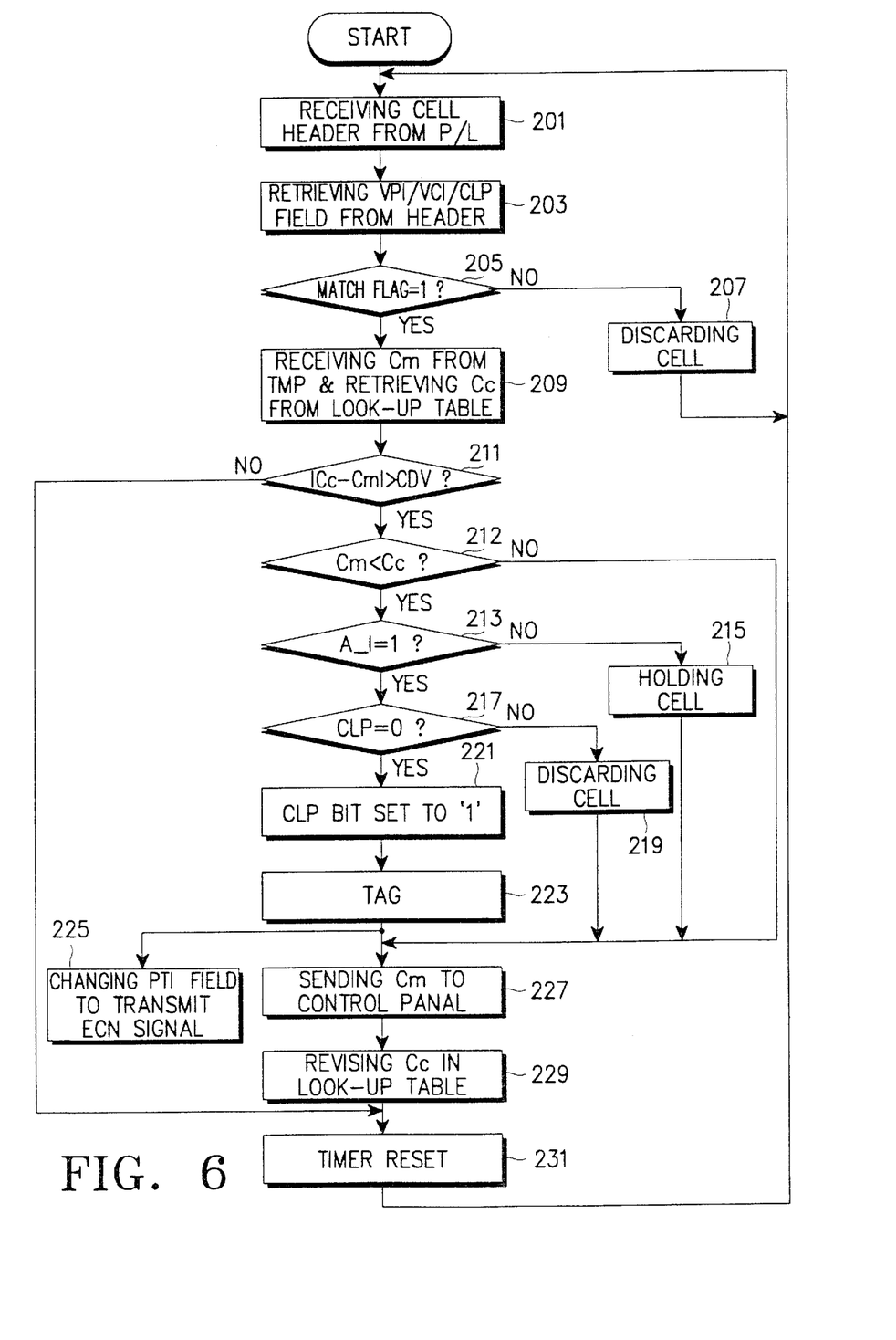
FIG. 6 is a flow chart for illustrating the algorithm to monitor and control cells in real time according to the present invention.

Describing specifically the algorithm of FIG. 6 in connection with FIGS. 1 to 5 and 7, header data processing unit 13 receives a cell of 53 bytes from the physical layer of an ATM network in step 201. Then, in step 203, it retrieves VPI/VCI and CLP fields from the header of the ATM cell of 5 bytes as shown in FIG. 3, transferring them to control action determination unit 15, which in step 205 checks the validity of the cell based on the match flag of the corresponding VPI/VCI retrieved from the look-up table 20 as shown in Table 1.

TABLE 1

Example of Look-up Table

| VPC/VCI 24 bits | Match Flag 1 bit | Cc 14 bits | CDV | A_I 1 bit | CNS 1 bit |
|---|---|---|---|---|---|
| #10 | 0 | — | xx | — | — |
| #20 | 1 | xx | xx | 0 | 0 or 1 |
| #30 | 1 | xx | xx | 1 | 0 or 1 |
| #40 | 0 or 1 | xx | xx | 1(o) | 0 or 1 |

Wherein xx: counter value; Match flag: Active High; A_I: Active High; CNS: Active High; and (o): Option.

Figure 7:
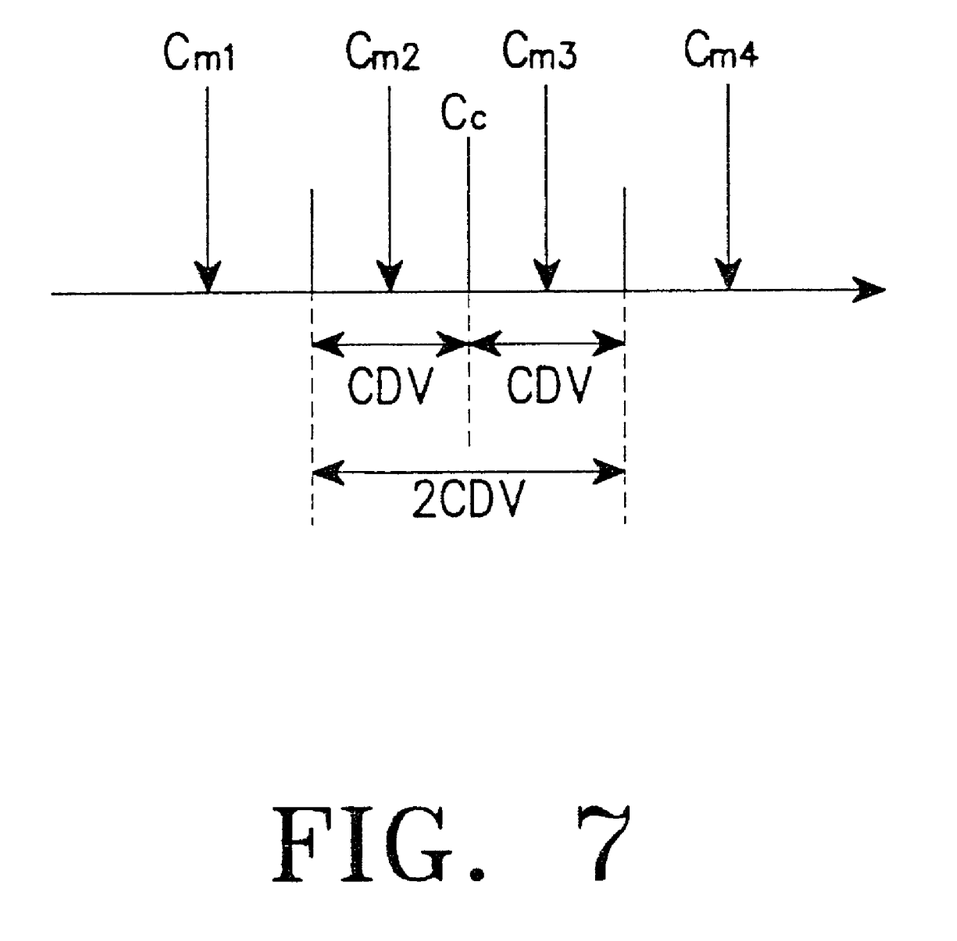
FIG. 7 is a schematic diagram for showing cell delay variation which is the range to allow cells without violating the traffic parameter.

If the match flag of the corresponding VPI/VCI of the look-up table 20 is '1', control action determination unit 15 determines that the cell is valid generated from a rightly set connection, proceeding to step 209. On the contrary, if the match flag is not equal to '1', it determines the cell to be invalid, proceeding to step 207 to discard the cell and returning to step 201. In step 209, control action determination unit 15 receives the cell monitor counter value Cm from traffic monitor part 17 while retrieving the cell control counter value Cc from the look-up table 20. In step 211, control action determination unit 15 compares the cell monitor counter value Cm with the cell control counter value Cc to check violation of the traffic parameter. In this case is used cell delay variation of the corresponding VPI/VCI, which is prescribed in the look-up table 20 upon setting the connection to cope with concentration of cells. If |Cc−Cm| is equal to or smaller than cell delay variation, the cell is allowed as valid, the monitoring and controlling of the cell is terminated, and the process proceeds to step 231 to stand by for the next cell. On the contrary, if |Cc−Cm|>CDV (cell delay variation), it proceeds to step 212 to determine whether Cc>Cm. If Cm<Cc, it goes to step 213, or otherwise to step 227. In other words, if Cm is determined in step 211 to come within cell delay variation, the cell is valid. On the contrary, if Cm does not come within cell delay variation, the cell is determined in step 212 to be valid or invalid according to the determination of whether Cc<Cm. For example, as shown in FIG. 7, Cm2, Cm3 and Cm4 are valid, and Cm1 invalid.

In step 213, control action determination unit 15 retrieves the traffic control data value A_I from the look-up table 20 to determine whether the present user's connection violates the negotiated parameter. If the value of the corresponding A_I bit is '1', it determines the cell violates the parameter, and proceeds to step 217. On the contrary, if the value of A_I bit is '0', it holds the cell in step 215, and proceeds to step 227. In step 217, if the value of CLP retrieved from the cell header is '1', it proceeds to step 219 to send to the physical layer a discard signal to discard the cell. On the contrary, if the value of CLP is '0', control action determination unit 15 sets the value of CLP bit to '1' in step 221, proceeding to step 223 to generate a control signal 'TAG'to the physical layer. Thereafter, it changes the value of the PTI (payload type identifier) field to transmit an explicit congestion notification (ECN) signal, displaying congestion of cells.

In step 227, control action determination unit 15 reports the result of controlling to monitor information reporting unit 19 to send the cell monitor counter value Cm to the control panel. Subsequently, in step 229, monitor data processing part 30 revise the cell control counter value Cc in the look-up table 20 based on the cell monitor counter value Cm. This is to control the traffic of the next cell by considering the difference between the cell control counter value Cc and the cell monitor counter value Cm even if the presently received cell is valid. Thus, the traffic may be controlled in real time. Finally, in step 231, the timer (binary counter) is reset to return to step 201 to repeat the previous steps 201 to 231 to monitor and control the next cell in real time.

Figure 8:
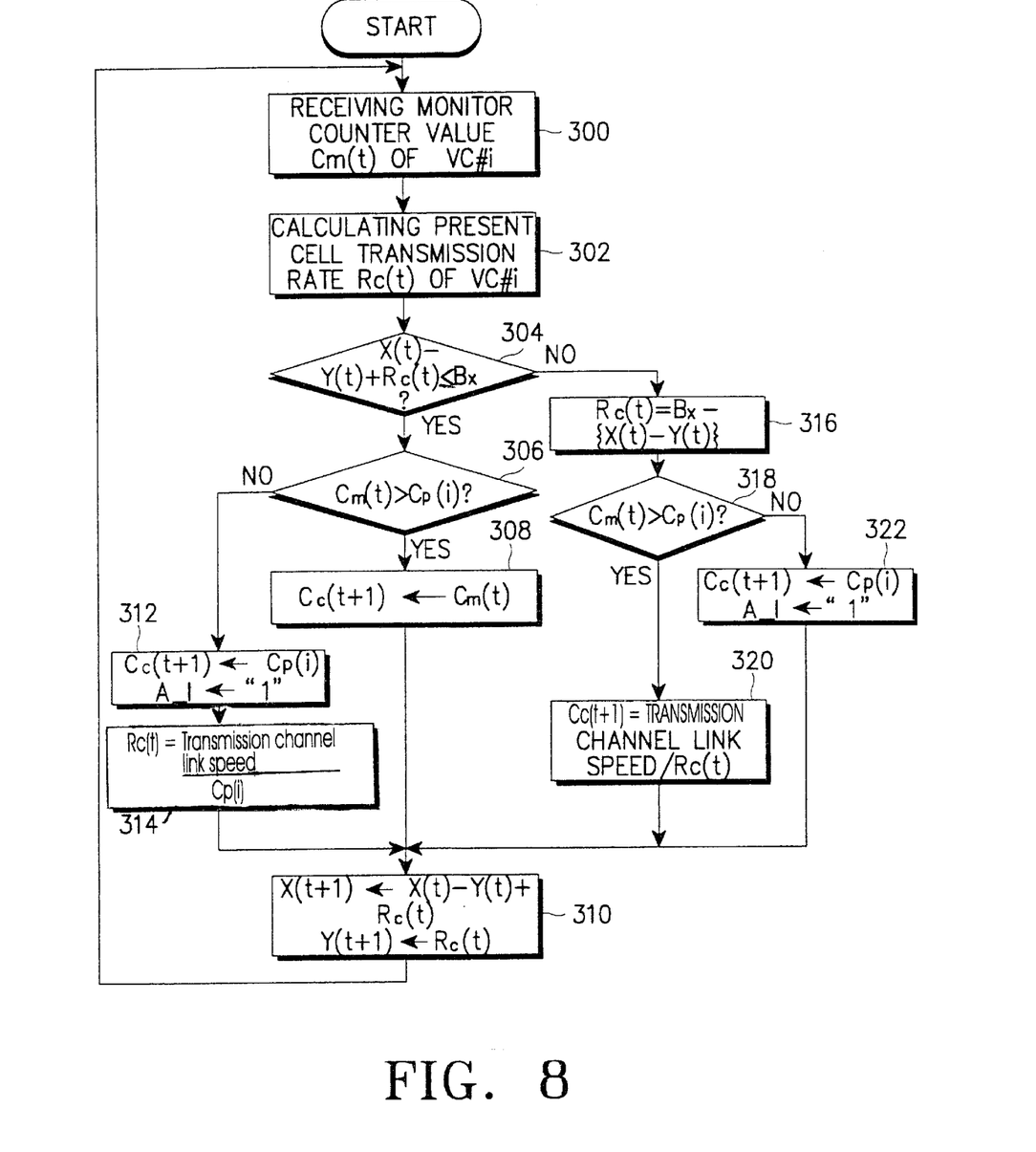
FIG. 8 is a flow chart for illustrating the process to control the transmission rate of the input data cells and revise the allotment of the bandwidth in the monitoring data processing part according to the present invention.
Figure 9:
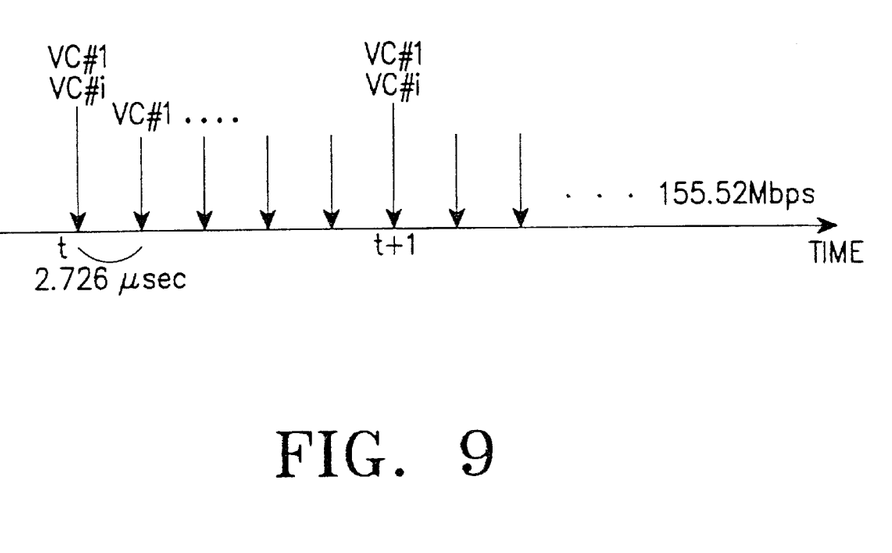
FIG. 9 is a schematic diagram for illustrating calculation of the monitoring counter value of the user's connection set in the transmission channel according to the present invention.

Referring to FIG. 8, monitor data processing part 30 controls the transmission rate of the data cell to newly allot the bandwidth according to the cell monitor counter value Cm transferred in real time from the ATM cell control block 10. When a data cell flows from the corresponding virtual channel VC#i set in an ATM network into the switching node, ATM cell control block 10 obtains the cell monitor counter value Cm of the data cell transferred through monitor information reporting unit 19 to monitor data processing part 30. The cell monitor counter value Cm is obtained by counting the number of the cells of the reference virtual channel flowing through the transmission channel of 155.52 Mbps at the time interval of 2.726 μsec during the time interval between two adjacent data cells of the corresponding virtual channel VC#i which flow into the switching node. More specifically describing the calculation of the cell monitor counter value Cm with reference to FIG. 9, the reference virtual channel VC#1 transmits a cell at a transmission rate of 155.2 Mbps at every 2.726 μsec while the virtual channel VC#i transmits a cell at every 5 cells of the reference virtual channel VC#1. Thus, the cell monitor counter value Cm of the virtual channel VC#i becomes '5' based on 2.726 μsec. This value Cm is used to calculate the cell transmission rate Rc(t) of the virtual channel VC#i transferring cells to the switching node at time 't'.

Referring again to FIG. 8, in step 300, monitor data processing part 30 receives the cell monitor counter value Cm(t) of the data cell through the virtual channel VC#i at time 't', proceeding to step 302 to calculate the present cell transmission rate Rc(t) of the data cell arriving at time 't' by means of the following Equation 3:

$$Rc(t) = \text{transmission channel link speed}/Cm(t) \qquad \text{Equation 3}$$

In step 304, monitor data processing part 30 determines whether the value obtained by subtracting the bandwidth Y(t) having been allotted to the virtual channel VC#i before time 't' from the total bandwidth X(t) presently allotted to the transmission channel and adding thereto the bandwidth corresponding to the present cell transmission rate Rc(t) of the virtual channel VC#i at time 't', exceeds the whole bandwidth Bx of the transmission channel. If it does not exceed the whole bandwidth Bx, monitor data processing part 30 goes to step 306 to determine whether the cell monitor counter value Cm of the present virtual channel VC#i is greater than the counted value Cp(i) of the maximum cell transmission rate negotiated in advance upon setting the connection. If Cm(t) is greater than Cp(i), monitor data processing part 30 goes to step 308 to revise the cell control counter value Cc(t+1) of the look-up table 20 with the present monitor counter value Cm(t). Subsequently, monitor data processing part 30 goes to step 310 to revise, as in the following Equation 4, the total bandwidth X(t+1) to be newly allotted to the transmission channel with the value obtained by subtracting the bandwidth Y(t) allotted to the virtual channel VC#i from the total bandwidth X(t) allotted to the transmission channel at time 't' and adding thereto the bandwidth corresponding to the present cell transmission rate Rc(t) of the virtual channel VC#i calculated at time 't' in step 302, and also to revise the bandwidth Y(t+1) to be allotted to the virtual channel VC#i with the bandwidth corresponding to the present cell transmission rate Rc(t):

$$X(t+1) = X(t) - Y(t) + Rc(t) \qquad \text{Equation 4}$$

On the contrary, if Cm(t) is not greater than Cp(i) in step 306, monitor data processing part 30 goes to step 312 to revise the cell control counter value Cc(t+1) of the look-up table 20 with the counted value Cp(i) of the maximum cell transmission rate negotiated in advance, and sets A_I bit as '1'. Subsequently monitor data processing part 30 goes to step 314 to obtain the present cell transmission rate Rc(t) by dividing the transmission channel link speed by the counted value Cp(i) of the maximum cell transmission rate as in the following Equation 5:

$$Rc(t) = \text{transmission channel link speed}/Cp(i) \qquad \text{Equation 5}$$

Then, monitor data processing part 30 goes to step 310 to revise the total bandwidth X(t+1) allotted to the transmission channel and the bandwidth Y(t+1) allotted to the virtual channel VC#i based on the present cell transmission rate Rc(t) obtained in step 314.

On the contrary, in step 304, if the value obtained by subtracting the bandwidth Y(t) having been allotted to the virtual channel VC#i before time 't' from the total bandwidth X(t) presently allotted to the transmission channel and adding thereto the bandwidth corresponding to the present cell transmission rate Rc(t) of the virtual channel VC#i at time 't', exceeds the whole bandwidth Bx of the transmission channel, monitor data processing part 30 goes to step 316 to set the present cell transmission rate Rc(t) of the virtual channel VC#i to the value obtained by subtracting the total bandwidth X(t) allotted to the transmission channel from the whole bandwidth Bx and adding thereto the bandwidth Y(t) allotted to the virtual channel VC#i, as in the following Equation 6:

$$Rc(t) = Bx - (X(t) - Y(t)) = Bx - X(t) + Y(t) \qquad \text{Equation 6}$$

In step 318, monitor data processing part 30 determines whether the cell monitor counter value Cm(t) corresponding to the present virtual channel VC#i is greater than the counted value Cp(i) of the maximum cell transmission rate negotiated in advance. If so, monitor data processing part 30 goes to step 320 to revise the cell control counter value Cc(t+1) of the look-up table 20 with the value obtained by dividing the transmission channel link speed by the present cell transmission rate Rc(t), as in the following Equation 7, and sets the bit of the congestion control signal to notify congestion of the present network:

$$Cc(t+1) = \text{transmission channel link speed}/Rc(t) \qquad \text{Equation 7}$$

In step 310, monitor data processing part 30 revises the total bandwidth X(t+1) allotted to the transmission channel and the bandwidth Y(t+1) allotted to the virtual channel VC#i based on the present cell transmission rate Rc(t) calculated in step 316.

On the contrary, in step 318, if Cm(t) is not greater than Cp(i), monitor data processing part 30 goes to step 322 to revise the cell control counter value Cc(t+1) of the look-up table with the counted value Cp(i) of the maximum cell transmission rate negotiated in advance, and sets the A_I bit to '1'. Then, in step 310, monitor data processing part 30 revises the total bandwidth X(t+1) allotted to the transmission channel and the bandwidth Y(t+1) allotted to the virtual channel VC#i based on the present cell transmission rate Rc(t) calculated in step 316. Thus, even if the data cells of an arbitrary virtual channel flow into the switching node of the ATM network at VBR with time, monitor data processing part 30 monitors them in real time so as to variably allot the allowable bandwidth according to the presently monitored cell transmission rate, thereby making efficient use of the bandwidth.

Figure 10:
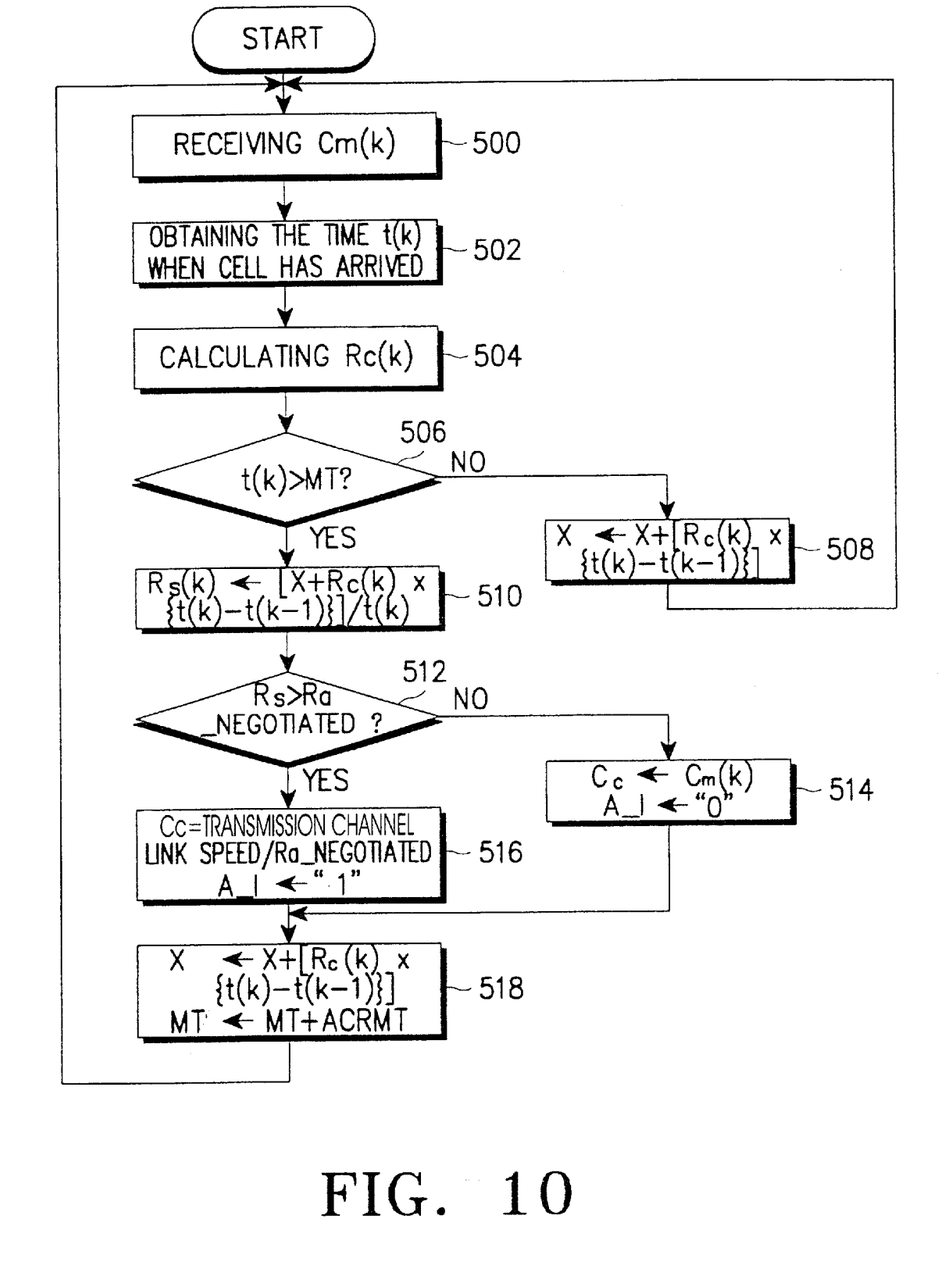
FIG. 10 is a flow chart for illustrating the process to control the average cell transmission rate of data cells in real time by the monitoring data processing part (MDPP) according to the present invention.

Hereinafter will be specifically described the process of controlling the average transmission rate of data cell in real time by monitor data processing part 30 with reference to FIGS. 1, 8, 9 and 10. When the k th data cell of the virtual channel VC#i set in the ATM network flows into the ATM switching node, ATM cell control block 10 obtains the present cell monitor counter value Cm(k) of the data cell transferred through monitor information reporting unit 19 to monitor data processing part 30, which in step 500 receives the cell monitor counter value Cm(k) of the k th data cell of the virtual channel VC#i. Then, in step 502, the time t(k) is calculated when the cell has arrived. Afterwards, in step 504, monitor data processing part 30 calculates the present cell transmission rate Rc(k) of the k th data cell, as shown in FIG. 8. In step 506, it is determined whether or not the cell arrival time t(k) exceeds the measurement time (MT) of the average cell transmission rate prescribed during setting the connection. Although the average cell transmission rate may actually be obtained by dividing the accumulation of all the cell transmission rates of the cells flowing through the virtual channel VC#i from beginning to end by the time of ending the transmission, it is of no use for processing the traffic in real time. Hence, in order to control the traffic in real time, it is necessary to periodically calculate the average cell transmission rate of the virtual channel VC#i. The measurement time of the average cell transmission rate means the time intervals properly set by the user according to the characteristics of the traffics, at which time intervals are measured the average cell transmission rates of the virtual channels set. If t(k) is not greater than the measurement time, monitor data processing part 30 goes to step 508 to add the transmission rate Rc(k) of the presently arriving cell to the value X of the dummy variable accumulating the transmission rates of the cells corresponding to the virtual channel VC#i, as in the following Equation 8:

$$X=X+[Rc(k)\times\{t(k)-t(k-1)\}] \quad \text{Equation 8}$$

Then, returning to step 500, monitor data processing part 30 stands by to receive the cell monitor counter value Cm of the k+1'st data cell of the virtual channel VC#i to arrive at time t(k+1).

On the contrary, if t(k) is greater than the measurement time, monitor data processing part 30 proceeds to the step 510 to calculate the average cell transmission rate Rs up to the cell arrival time t(k), as in the following Equation 9:

$$Rs=[X+Rc(k)\times\{t(k)-t(k-1)\}]/t(k) \quad \text{Equation 9}$$

Thus, the average cell transmission rate Rs up to the cell arrival time t(k) is obtained by dividing the accumulation of the transmission rates of the cells corresponding to the virtual channel VC#i by the cell arrival time t(k). In step 512, monitor data processing part 30 determines whether the average cell transmission rate Rs at the time t(k) is greater than the average cell transmission rate Ra_negotiated negotiated during setting the connection of the virtual channel VC#1. If Rs is not greater than Ra_negotiated, monitor data processing part 30 determines that the data cells of the virtual channel VC#i do not violate the average cell transmission rate, then proceeds to step 514 to revise the cell control counter value Cc of the look-up table 20 with the cell monitor counter value Cm(k), and reset the A_I bit to '0'.

On the contrary, in step 512, if Rs is greater than Ra_negotiated, the cells of the virtual channel VC#I flowing into the switching node violate the average cell transmission rate, so that monitor data processing part 30 goes to step 516 to revise the cell control counter value Cc of the look-up table with the value obtained by dividing the transmission channel link speed by the negotiated average cell transmission rate Ra negotiated, as in the following Equation 10, and sets A_I bit as '1'.

$$Cc=\text{transmission channel link speed}/Ra\_negotiated \quad \text{Equation 10}$$

Then, monitor data processing part 30 goes to step 518 to add the transmission rate Rc(k) of the cell arriving at the time t(k) to the value X of the dummy variable accumulating the transmission rates of the cells corresponding to the virtual channel VC#I, and also accumulating the given time interval between the measurement times MT's to MT at every routine (ACRMT), as in the following Equation 11:

$$X=X+[Rc(k)\times\{t(k)-t(k-1)\}] \quad \text{Equation 11}$$

$$MT=MT+ACRMT$$

Thus, it is possible to control the average cell transmission rate of the virtual channel in real time by calculating the average cell transmission rate at a given time interval.

As described above, the invention provides an algorithm to monitor and control the ATM traffic in real time, which may be applied to various ATM services such as VBR, ABR and UBR. This optimizes the utilization of the network resources by allotting the unused bandwidth to the virtual channels requiring more capacity without degrading QOS. While the present invention has been described with specific embodiments accompanied by the attached drawings, it will be appreciated by those skilled in the art that various changes and modifications may be made thereto without departing the gist of the present invention.

What is claimed is:

1. A method for monitoring and controlling traffic in real time at an asynchronous transfer mode (ATM) switching node, comprising steps of method for monitoring and controlling cells by:

retrieving a virtual path identifier (VPI)/virtual channel identifier (VCI) field and a cell loss priority (CLP) field from a header of a received cell to determine the validity of said cell by checking an effective value of said header for the VPI/VCI field;

comparing a cell monitoring counter value with a cell control counter value to detect violation of a traffic parameter when said cell is determined to be valid;

determining whether a present user's connection violates a negotiated parameter by means of a traffic control data Active_Idle bit and the cell loss priority field when said cell violates said traffic parameter;

holding, tagging and discarding said cell according to whether said cell violates said negotiated parameter;

transferring a result of controlling a valid cell to a physical layer to process said valid cell; and reporting said cell monitoring counter value to a control panel of upper hierarchy to change said cell counter control value based on said cell monitoring counter value.

2. A method as defined in claim 1, wherein said cell monitoring counter value is the number of the cells of a reference virtual channel flowing through a transmission channel during a time interval between two adjacent cells of a corresponding virtual channel measured by a binary counter in a physical layer.

3. A method as defined in claim 1, wherein said cell control counter value is determined by the following equation immediately after setting a link connection, specified in a look-up table, and then revised according to said cell monitoring counter value during cell processing:

$$Cc=\text{cell size}\div(Rp\times one\_cell\_time)$$

wherein Cc represents the cell control counter value immediately after setting the link connection, Rp represents the maximum cell transmission rate negotiated during setting the link connection, and one_cell_time equals 2.726 μsec as obtained from an interface speed between ATM networks.

4. A method as defined in claim 3, wherein the step of comparing said cell monitoring counter value with said cell control counter value to detect violation of said traffic parameter is to allow said cell if said cell monitoring counter value comes within a cell delay variation specified around said cell control counter value, or otherwise to determine said cell as violating said traffic parameter.

5. A method as defined in claim 4, wherein said cell delay variation is predetermined during the setting of the link connection, and specified in said look-up table.

6. A method as defined in claim 1, including a further step of standing by to process the next cell after discarding the cell determined as violating said negotiated parameter.

7. A method as defined in claim 4, including a further step of standing by to process the next cell after allowing said cell determined as valid and terminating the monitoring and controlling of said cell.

8. A method as defined in claim 2, wherein said binary counter has a minimum bit capacity according to a time interval between the adjacent cells determined by the following Equation:

$$T_{icat} = \text{line speed} \div Rc$$

wherein line speed represents the link speed of the traffic, Rc the cell transmission rate of a traffic source, and $T_{icat}$ the time interval between the adjacent cells.

9. A method as defined in claim 1, further comprising a step of controlling, by said control panel, a cell transmission rate of a virtual channel transmitting said cell at a variable bit rate according to said cell monitoring counter value.

10. A method as defined in claim 9, wherein the step of controlling said cell transmission rate comprises the steps of:
   measuring the present cell transmission rate of said cell according to said cell monitoring counter value;
   resetting the traffic control data Active_Idle bit after revising said cell control counter value specified in said look-up table with said cell monitoring counter value when a transmission channel has a remaining bandwidth enough to allot the bandwidth according to the present cell transmission rate to said virtual channel and said present cell transmission rate is lower than a maximum cell transmission rate previously negotiated;
   revising the total bandwidth allotted on said transmission channel before arrival of the cell belonging to said virtual channel so as to include said present cell transmission rate; and
   allotting the bandwidth according to said present cell transmission rate.

11. A method as defined in claim 10, wherein the step of controlling said cell transmission rate comprises the steps of:
   allotting to said virtual channel the bandwidth remaining after subtracting the total bandwidth allotted on said transmission channel before the arrival of said cell from the total bandwidth of said transmission channel when the transmission channel does not have a remaining bandwidth enough to allot the bandwidth according to said present cell transmission rate to said virtual channel;
   setting a congestion control signal bit after revising said cell control counter value with the value obtained by dividing the link speed of said transmission channel by the present cell transmission rate of the revised virtual channel when said present cell transmission rate is lower than said maximum cell transmission rate;
   setting said the traffic control data Active_Idle bit after revising said cell control counter value with the value according to said maximum cell transmission rate when said present cell transmission rate is higher than said maximum cell transmission rate; and
   revising the total bandwidth allotted on said transmission channel before the arrival of the cell belonging to said virtual channel to include the bandwidth additionally allotted said virtual channel.

12. A method as defined in claim 10, further including the steps of:
   setting the traffic control data Active_Idle bit after revising said cell control counter value specified in said look-up table with a maximum counted value according to said maximum cell transmission rate when the transmission channel has a remaining bandwidth enough to allot the bandwidth according to said present cell transmission rate to said virtual channel and said present cell transmission rate is higher than the maximum cell transmission rate previously negotiated;
   resetting said present cell transmission rate with a value obtained by dividing the link speed of said transmission path by said maximum counted value; and
   revising the total bandwidth allotted on said transmission channel before the arrival of the cell belonging to said virtual channel so as to allot the bandwidth according to the reset cell transmission rate to said virtual channel.

13. A method for monitoring and controlling traffic in real time at an asynchronous transfer mode (ATM) switching node, which comprises an ATM cell control block for measuring a time interval between two adjacent cells by a counter in an ATM layer to report it to a monitoring data processing part, and a look-up table for specifying control data and an effective value of a header of a received cell according to a virtual path identifier/virtual channel identifier VPI/VCI field and cell loss priority CLP field and a violation determination value, comprising the steps of:
   retrieving the VPI/VCI field and the CLP field from said header;
   determine the validity of the received cell by checking an effective value of said header for the VPI/VCI field;
   comparing a cell monitoring counter value with a cell control counter value to detect violation of a traffic parameter when said cell is determined to be valid;
   determining whether a present user's connection violates a negotiated parameter by means of a traffic control data Active_Idle bit and said CLP field when said cell violates said traffic parameter;
   holding, tagging and discarding said cell when said cell violates said negotiated parameter;
   transferring a result of controlling a valid cell to a physical layer to process said cell; and
   reporting said cell monitoring counter value to a control panel of upper hierarchy to change said cell counter control value based on said cell monitoring counter value.

14. A method as defined in claim 13, wherein said cell monitoring counter value is the number of the cells of a reference virtual channel flowing through a transmission channel during a time interval between two adjacent cells of a corresponding virtual channel measured by a binary counter in a physical layer.

15. A method as defined in claim 13, wherein said cell control counter value is determined by the following Equation immediately after setting a link connection, specified in said look-up table, and then revised according to said cell monitoring counter value during cell processing:

$$Cc = \text{cell size} \div (Rp \times \text{one\_cell\_time})$$

wherein Cc represents the cell control counter value immediately after setting the link connection, Rp is a maximum cell transmission rate negotiated during setting the link connection, and one_cell_time is equal to 2.726 μsec obtained from an interface speed between ATM networks.

16. A method as defined in claim 13, wherein the step of comparing the cell monitoring counter value with the cell control counter value to detect violation of the traffic parameter allows said cell if said cell monitoring counter value comes within a cell delay variation specified around said cell control counter value, or otherwise determines said cell as violating said traffic parameter.

17. A method as defined in claim 16, wherein said cell delay variation is predetermined during setting the link connection, and specified in said look-up table.

18. A method as defined in claim 13, including a further step of standing by to process a next cell after discarding said cell determined as violating said negotiated parameter.

19. A method as defined in claim 13, including a further step of standing by to process a next cell after allowing said cell determined as valid and terminating the monitoring and controlling of said cell.

20. A method as defined in claim 14, wherein said binary counter has a minimum bit capacity according to a time interval between the adjacent cells determined by the following Equation:

$$T_{icat} = \text{line speed} \div Rc$$

wherein line speed represents the link speed of the traffic, Rc the cell transmission rate of a traffic source, and $T_{icat}$ the time interval between the adjacent cells.

21. A method as defined in claim 13, wherein the step of controlling said cell transmission rate by said monitoring data processing part comprises the steps of:

measuring the present transmission rate of said cell according to said cell monitoring counter value;

resetting the traffic control data Active_Idle bit after revising said cell control counter value specified in said look-up table with said cell monitoring counter value when the transmission channel has a remaining bandwidth enough to allot the bandwidth according to the present cell transmission rate to said virtual channel and said present cell transmission rate is lower than the maximum cell transmission rate previously negotiated;

revising the total bandwidth allotted on said transmission channel before arrival of the cell belonging to said virtual channel so as to include said present cell transmission rate; and allotting the bandwidth according to said present cell transmission rate.

22. A method as defined in claim 21, wherein the step of controlling said cell transmission rate by said monitoring data processing part comprises the steps of:

allotting to said virtual channel the bandwidth remaining after subtracting the total bandwidth allotted on said transmission channel before the arrival of said cell from the total bandwidth of said transmission channel when the transmission channel does not have a remaining bandwidth enough to allot the bandwidth according to said present cell transmission rate to said virtual channel;

setting a congestion control signal bit after revising said cell control counter value with the value obtained by dividing the link speed of said transmission channel by the present cell transmission rate of the revised virtual channel when said present cell transmission rate is lower than said maximum cell transmission rate;

setting said traffic control data Active_Idle bit after revising said cell control counter value with the value according to said maximum cell transmission rate when said present cell transmission rate is higher than said maximum cell transmission rate; and revising the total bandwidth allotted on said transmission channel before the arrival of the cell belonging to said virtual channel to include the bandwidth additionally allotted said virtual channel.

23. A method as defined in claim 21, further including the steps of:

setting said traffic control data Active_Idle bit after revising said cell control counter value specified in said look-up table with the maximum counted value according to said maximum cell transmission rate when the transmission channel has a remaining bandwidth enough to allot the bandwidth according to said present cell transmission rate to said virtual channel and said present cell transmission rate is higher than the maximum cell transmission rate previously negotiated;

resetting said present cell transmission rate with the value obtained by dividing the link speed of said transmission path by said maximum counted value; and revising the total bandwidth allotted on said transmission channel before the arrival of the cell belonging to said virtual channel so as to allot the bandwidth according to the reset cell transmission rate to said virtual channel.

24. A method for monitoring and controlling traffic in real time at an asynchronous transfer mode (ATM) switching node, which comprises an ATM cell control block for measuring a time interval between two adjacent cells by a counter in an ATM layer to report it to a monitoring data processing part, and a look-up table for specifying the cell control counter value and the effective value of the header of a received ATM cell according to VPI/VCI (virtual path identifier/virtual channel identifier), traffic control data value for serving as a reference to determine violation of a negotiated traffic parameter, and cell delay variation, comprising the steps of:

retrieving the VPI/VCI field and a cell loss priority (CLP) field from a 5-byte header of the ATM cell of 53 bytes received from a physical layer;

determining the validity of said cell by checking the effective value of said header for VPI/VCI field transferred to said look-up table;

retrieving said cell control counter value from said look-up table and a cell monitoring counter value obtained by measuring the number of the cells of a reference virtual channel flowing through a transmission channel during a time interval between two adjacent cells from a traffic monitor part when said cell is determined as valid;

determining said cell as not violating said traffic parameter when said cell monitoring counter value comes within a cell delay variation specified around said cell control counter value or is greater than said cell control counter value, or as violating said traffic parameter when said cell monitoring counter value does not come within said cell delay variation and is smaller than said control counter value;

determining whether the present user's connection violates the negotiated traffic parameter by means of said traffic control data value when said cell violates said traffic parameter;

tagging or discarding said cell according to the CLP field value when said cell is determined as violating said negotiated traffic parameter;

transferring a result of controlling the valid cell to the physical layer to process said cell;

reporting said cell monitoring counter value to a control panel of upper hierarchy to change said cell counter control value based on said cell monitoring counter value; and resetting the counter upon completion of monitoring and controlling said received cell to repeat the previous steps for processing the next cell.

25. A method as defined in claim 24, wherein the time interval between two adjacent cells is measured by a binary counter in the physical layer.

26. A method as defined in claim 25, wherein said binary counter has the minimum bit capacity according to the time interval between the adjacent cells determined by the following Equation:

$$T_{icat} = \text{line speed} \div Rc$$

wherein line speed represents the link speed of the traffic, Rc the cell transmission rate of a traffic source, and $T_{icat}$ the time interval between the adjacent cells.

27. A method as defined in claim 24, wherein said cell control counter value is determined by the following Equation immediately after setting a link connection, specified in a look-up table, and then revised according to said cell monitoring counter value during cell processing:

$$Cc = \text{cell size} \div (Rp \times \text{one\_cell\_time})$$

wherein Cc represents the cell control counter value immediately after setting the connection, Rp the maximum cell transmission rate negotiated during setting the connection, and one_cell_time is equal to 2.726 μsec obtained from an interface speed between ATM networks.

28. A method as defined in claim 24, including the further step of standing by to process the next cell after discarding a cell determined as violating said negotiated traffic parameter.

29. A method as defined in claim 24, including the further step of standing by to process a next cell after allowing said cell determined as valid and terminating the monitoring and controlling of said cell.

30. A method as defined in claim 24, wherein said traffic control data value serves as a reference to determine whether the corresponding connection violates the negotiated traffic parameter and to control access to the unused bandwidth.

31. A method as defined in claim 24, further including a step of displaying the congestion of cells by changing a payload type identifier field of said cell header to transmit an explicit congestion notification signal upon said tagging.

32. A method as defined in claim 24, further including a step of holding said cell when said cell is determined as valid as violating said negotiated traffic parameter.

33. A method as defined in claim 24, wherein the step of controlling said cell transmission rate by said monitoring data processing part comprises the steps of:

measuring the present transmission rate of said cell according to said cell monitoring counter value;

resetting a traffic control data Active_Idle bit after revising said cell control counter value specified in said look-up table with said cell monitoring counter value when the transmission channel has a remaining bandwidth enough to allot the bandwidth according to the present cell transmission rate to said virtual channel and said present cell transmission rate is lower than the maximum cell transmission rate previously negotiated;

revising the total bandwidth allotted on said transmission channel before arrival of the cell belonging to said virtual channel so as to include said present cell transmission rate; and allotting the bandwidth according to said present cell transmission rate.

34. A method as defined in claim 33, wherein the step of controlling said cell transmission rate by said monitoring data processing part comprises the steps of:

allotting to said virtual channel the bandwidth remaining after subtracting the total bandwidth allotted on said transmission channel before the arrival of said cell from the total bandwidth of said transmission channel when the transmission channel does not have a remaining bandwidth enough to allot the bandwidth according to said present cell transmission rate to said virtual channel;

setting a congestion control signal bit after revising said cell control counter value with the value obtained by dividing the link speed of said transmission channel by the present cell transmission rate of the revised virtual channel when said present cell transmission rate is lower than said maximum cell transmission rate;

setting said traffic control data Active_Idle bit after revising said cell control counter value with the value according to said maximum cell transmission rate when said present cell transmission rate is higher than said maximum cell transmission rate; and revising the total bandwidth allotted on said transmission channel before the arrival of the cell belonging to said virtual channel to include the bandwidth additionally allotted said virtual channel.

35. A method as defined in claim 33, further comprising the steps of:

setting said traffic control data Active_Idle bit after revising said cell control counter value specified in said look-up table with the maximum counted value according to said maximum cell transmission rate when the transmission channel has a remaining bandwidth enough to allot the bandwidth according to said present cell transmission rate to said virtual channel and said present cell transmission rate is higher than the maximum cell transmission rate previously negotiated;

resetting said present cell transmission rate with the value obtained by dividing the link speed of said transmission path by said maximum counted value; and revising the total bandwidth allotted on said transmission channel before the arrival of the cell belonging to said virtual channel so as to allot the bandwidth according to the reset cell transmission rate to said virtual channel.

* * * * *